Patented May 10, 1949

2,469,838

UNITED STATES PATENT OFFICE 2,469,838

SULFOLANYL CARBAMATES

Rupert C. Morris, Berkeley, and Robert M. Horowitz, Los Angeles, Calif., assignors to Shell Development Company, San Francisco, Calif., a corporation of Delaware No Drawing. Application October 28, 1946, Serial No. 706,094

18 Claims. (Cl. 260—77.5)

This invention relates to a novel and particularly useful class of carbamates. More particularly, the invention pertains to sulfolanyl carbamates which are formed by replacing a hydrogen atom of the amino group of a carbamate by a sulfolanyl radical. The invention further pertains to a method for the production of the novel sulfolanyl carbamates and to the new and useful polymers thereof.

It is an object of the present invention to provide a new and useful class of chemical compounds. A further object of the invention is to provide a method for the production of the new compounds. A still further object is to provide polymers of the new compounds which have advantageous properties making them useful in many industrial applications. Other objects and advantages of the invention will be apparent from the following detailed description thereof.

The novel compounds of the invention comprise broadly the N-substituted, substituted and unsubstituted sulfolanyl carbamates, the N-substituted, substituted and unsubstituted sulfolanyl thiocarbamates, and the N-substituted, substituted and unsubstituted sulfolanyl dithiocarbamates. More particularly, the compounds may be described as substituted or unsubstituted cyclic sulfones which are directly attached by a single bond to the nitrogen atom of a carbamate, thiocarbamate, or dithiocarbamate radical, that is a radical of the group consisting of

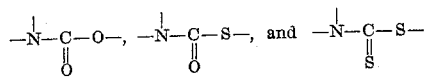

radicals, which radical is in turn directly attached through the other free bond of the nitrogen atom to a hydrogen atom or an organic radical, and the free bond of the oxygen or sulfur atom is directly attached to an organic radical. The novel compounds of the invention are more fully described by the following general structural formula

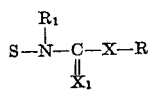

wherein S is the sulfolanyl radical or a substituted sulfolanyl radical, X and $X_1$ are the same or different substituents comprising an oxygen atom or a sulfur atom, R is an organic radical, and $R_1$ is a hydrogen atom or an organic radical.

The cyclic sulfone attached to the nitrogen atom of the carbamate radical is a five-membered heterocyclic ring consisting of four nuclear carbon atoms and a sulfonyl radical. The four nuclear carbon atoms have all their valences saturated. Such saturated cyclic sulfones are referred to herein as sulfolanes. These compounds have also been termed "thiocyclopentane-1,1-dioxide," "thiolane-1,1-dioxide," "cyclotetramethylene sulfone" or "dihydro-butadiene sulfone." The saturated cyclic sulfone when attached to other groups through one of the bonds of the four nuclear carbon atoms is referred to herein as the sulfolanyl radical. By the term "sulfolanyl radical" as employed in the specification and claims is meant the cyclic saturated sulfone radical, the structural formula of which is represented by

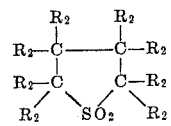

wherein one $R_2$ represents the free bond of the radical and the other $R_2$'s represent hydrogen atoms.

By the term "substituted sulfolanyl" radicals as employed in the specification and appended claims is meant the substituted cyclic saturated sulfone radicals having the following general structural formula:

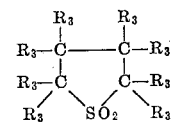

wherein one $R_3$ represents the free bond of the radical and at least one of the other $R_3$'s represents a halogen atom or an organic radical and the remaining $R_3$'s are hydrogen atoms.

The saturated cyclic sulfones can be prepared from unsaturated cyclic sulfones termed sulfolenes. By the term sulfolene as employed herein is meant a five-membered heterocyclic ring consisting of four nuclear carbon atoms and a sulfonyl radical with a double bond between two of the nuclear carbon atoms. The sulfolenes may be represented by the formulae

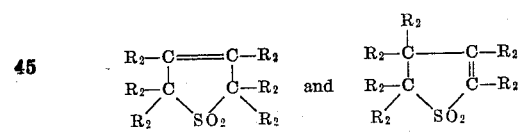

The numbering system of the sulfolane or sulfolene ring is indicated below:

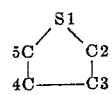

This is in accordance with the accepted system of numbering as exemplified by the compounds of this type of ring structure given on page 44 of Patterson and Capell, The Ring Index, Reinhold Publishing Corp., New York, 1940 Am. Chem. Soc. Monograph No. 84. The system of nomenclature may be exemplified by the compound having the structure

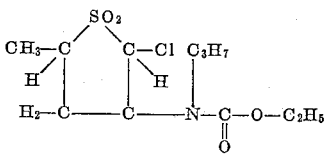

which is termed ethyl 3-[2-chloro-5-methylsulfolanyl (N-propyl)] carbamate.

The halogen atoms which may be directly attached to one or more of the nuclear carbon atoms of the cyclic sulfone nucleus, as represented by $R_3$ of the general formula of the compounds of the invention, may be any halogen atom, but are preferably chlorine, bromine or iodine atoms, and more preferably the chlorine atom.

The $R_3$ of the general formula of the compounds of the invention may also be an organic radical. Preferred organic radicals are the hydrocarbon radicals and the substituted hydrocarbon radicals. The more preferred of the two groups of radicals are the hydrocarbon radicals which may be cyclic or acyclic, saturated, unsaturated or aromatic, such as the alkyl, alkenyl, aryl, alkaryl, alkenaryl, aralkyl, aralkenyl, cycloalkyl and cycloalkenyl radicals. Examples of the hydrocarbon radicals which may be attached to the nuclear carbon atoms are methyl, ethyl, propyl, isopropyl, n-butyl, isobutyl, sec-butyl, tert-butyl, n-pentyl, isopentyl, sec-pentyl, hexyl, n-octyl, isooctyl, n-decyl, isodecyl, trimethyloctadecyl, allyl, methallyl methyl vinyl carbinyl, butenyl, pentenyl, hexenyl, phenyl, naphthyl, anthryl, tolyl, xylyl, sec-butylnaphthyl, dipropylnaphthyl, cyclohexenyl, vinylcyclohexenyl, tributylcyclohexyl, cyclopentenyl, etc.

The substituted hydrocarbon radicals, represented by $R_3$, which may be attached to the sulfone nucleus are those wherein one or more hydrogen atoms of a hydrocarbon radical has been replaced by an inorganic element or radical or by an organic radical containing one or more oxygen, nitrogen or sulfur atoms. Examples of the inorganic elements which may be attached to the hydrocarbon radicals are the chlorine, bromine and iodine atoms, and the sulfate, sulfite, nitrate and nitrite radicals. Examples of the organic radicals containing inorganic elements, that may be attached to the hydrocarbon radicals are the hydroxyl, carboxyl, ether, thioether, etc. radicals. The preferred group of the substituted hydrocarbon radicals are the halogen-substituted radicals such as chloromethyl, dichloroethyl, 2-chlorobutyl, chloroallyl, bromoallyl, dichlorophenyl, chlorocyclohexenyl and the like and their homologues and analogues.

The radicals which $R_3$ may represent also include the heterocyclic radicals in which an oxygen, nitrogen, sulfur, etc. atom or atoms is included in the ring system. Examples of such radicals are furfuryl, thiophenyl, sulfolanyl, pyridinyl, etc.

The organic radicals represented by $R$ and $R_1$ of the general structural formula of the compounds of the invention are monovalent radicals which are preferably hydrocarbon radicals having from 1 to 20 carbon atoms and may be cyclic or acyclic, saturated, unsaturated or aromatic. Representative examples of such hydrocarbon radicals are methyl, propyl, isobutyl, hexyl, n-decyl, allyl, butenyl, phenyl, etc. $R$ and $R_1$ may also be substituted hydrocarbon radicals and heterocyclic radicals represented by examples listed hereinabove for the $R_3$ radicals.

A preferred group of radicals for the R of the structural formula of the novel compounds are those which have an unsaturated linkage of aliphatic character between two carbon atoms, one of which is joined to a saturated carbon atom from which stems a free valence of the radical. Of these a preferred group consists of allyl-type radicals, which are monovalent radicals having an olefinic double bond between two carbon atoms, one of which is joined to a saturated carbon atom from which stems the free valence of the radical. Allyl-type radicals have the structure

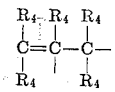

wherein each $R_4$ is the same or different substituent of the group comprising the hydrogen atom, halogen atom or an organic radical of the type previously discussed as being represented by $R_2$. Especially advantageous are the radicals of this type having a terminal methylene group, i. e. radicals having the structure

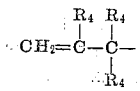

wherein each $R_4$ is the same or different substituents of the group comprising the hydrogen atom, halogen atom or an organic radical of the type previously discussed as being represented by $R_2$. Allyl-type radicals having the terminal methylene group are especially preferred because they are more readily polymerized and form polymeric products having many industrial applications more fully discussed hereinafter. Allyl-type radicals having not more than about 20 carbon atoms are preferred.

Examples of the allyl-type radicals are isobutenyl carbinyl, cinnamyl, 2,4-hexadiene-yl-1, 2,3-butadiene-yl-1, 3,5-hexadiene-yl-2, 3,7-dimethyl-2,7-octadiene-yl-1, 2-cyclohexene-yl-1, 2-cyclopentene-yl-1, etc. Examples of the preferred allyl-type radicals having the terminal methylene group are allyl, methyl vinyl carbinyl, ethyl vinyl carbinyl, propyl vinyl carbinyl, methallyl, ethallyl, chloroallyl, propallyl, methyl isopropenyl carbinyl, ethyl isopropenyl carbinyl, etc.

Following are listed a few examples illustrating the novel compounds of the invention:

Methyl 3-sulfolanyl carbamate
Methyl 3-(2-methyl sulfolanyl) carbamate
Ethyl 3-(2,5-dimethylsulfolanyl) carbamate
Propyl 3-sulfolanyl carbamate
Propyl 3-sulfolanyl (N-methyl) carbamate
Methyl 3-sulfolanyl thiocarbamate
Ethyl 3-sulfolanyl dithiocarbamate
Ethyl 3-sulfolanyl (N-methyl) thiocarbamate
Butyl 3-(2,4-dimethylsulfolanyl) carbamate
Butyl 3-(2-chloro-3-methylsulfolanyl) carbamate
Pentyl 3-(2,4-dipropylsulfolanyl) thiocarbamate
Ethyl 3-(3,4-dibutylsulfolanyl) carbamate
Ethyl 3-(5-phenylsulfolanyl) carbamate
2-chlorobutyl 3-(2,5-diethylsulfolanyl) carbamate
2-chlorobutyl 3-(1-vinylsulfolanyl) carbamate A few examples illustrating the preferred compounds in which the R of the general formula of the novel compounds of the invention is an allyl-type radical are as follows:

Allyl 3-sulfolanyl carbamate
Methallyl 3-(2,5-diethylsulfolanyl) carbamate
Ethallyl 3-(2,4-dimethylsulfolanyl) carbamate
Allyl 3-sulfolanyl thiocarbamate Chloro-methallyl 3-sulfolanyl (N-methyl) carbamate
Methallyl 3-(2,5-dimethylsulfolanyl) dithiocarbamate
2-chloroallyl 3-sulfolanyl carbamate
Propallyl 3-sulfolanyl (N-methyl) carbamate
2-chloroallyl 3-(2-chloro-3-ethylsulfolanyl) (N-propyl) carbamate
Ethyl isopropenyl carbinyl 3-(5-phenylsulfolanyl) carbamate
Methallyl 3-(2-vinylsulfolanyl) carbamate
Dimethyl vinyl carbinyl 3-(2,4-dimethylsulfolanyl) carbamate
Ethyl propenyl carbinyl 3-sulfolanyl thiocarbamate
Chloro-allyl 3-(2,4-dimethylsulfolanyl) dithiocarbamate
Propallyl 3-sulfolanyl (N-ethyl) dithiocarbamate The novel compounds of the invention may be produced by any suitable method. They can, for example, be produced by the addition of the desired carbamate to the double bond of a cyclic sulfolene. For instance, ethyl 3-sulfolanyl carbamate may be prepared by the addition of ethyl carbamate to 3-sulfolene. However, a much more convenient and preferred method for the production of the compounds of the invention is the novel method of reaction a sulfolanylamine with the desired ester of chloro-formic acid. Ethyl 3-sulfolanyl carbamate may be prepared by this preferred method, for example, by the reaction of 3-sulfolanylamine with ethylchloroformate. The sulfolanyl thio- or dithiocarbamates may be prepared by the same preferred method by reacting a sulfolanylamine with an ester of chloro-thiol-formic acid (ClCOSH), chloro-thion-formic acid (ClCSOH) or chloro-dithio-formic acid (ClCSSH). In the case of the thio-esters the chloro-thiol-formic acid ester and the chloro-thion-formic acid ester form the same sulfolanyl carbamate since the sulfur atom resonates between the two possible isomeric structures.

The saturated cyclic sulfolanylamine to be used in the preferred method of preparing the compounds of the invention can be produced by reacting sulfur dioxide with the appropriate conjugated diolefinic compound and then reacting the sulfolene with ammonia. Amines produced by this process will have two hydrogen atoms on the amino group available for being replaced by the formic acid ester. To produce sulfolanylamines with an organic radical in place of one of the hydrogen atoms of the amino group it is only necessary to add the desired primary amine to the sulfolene in place of the ammonia.

Primary amines that may be added to the sulfolene may be substituted or unsubstituted and may be cyclic or acylic, homocyclic or heterocyclic, saturated, unsaturated or aromatic, such as the alkyl, alkenyl, aryl, alkaryl, alkenaryl, aralkyl, aralkenyl, cycloalkyl, cycloalkenyl, etc. Examples of suitable amines that may be added to the sulfolene are methylamine, ethylamine, butylamine, buteneamine, isobutylamine, phenylamine, cyclohexylamine and the like and their substitution products.

The preferred method for the production of the novel compounds of the invention may be represented by the general equation:

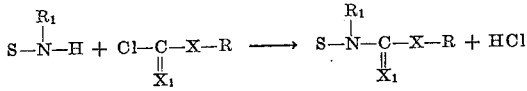

wherein S is the sulfolanyl radical or a substituted sulfolanyl radical, X and $X_1$ are the same or different substituents comprising an oxygen atom or a sulfur atom, R is an organic radical, and $R_1$ is a hydrogen atom or an organic radical.

In those cases where the sulfolene has been reacted with ammonia and has two replaceable hydrogen atoms on the amino group, both hydrogen atoms can be replaced by the carbamate radicals by merely increasing the proportion of the chloroformate and varying the reaction conditions.

The preferred method for the production of the compounds of the invention can be more clearly illustrated by showing how the reaction may be used to prepare a specific compound such as ethyl 3-sulfolanyl (N-methyl) carbamate. Methyl 3-sulfolanylamine is prepared from 3-sulfolene by treating it under pressure with methylamine. The methyl 3-sulfolanylamine thus formed is then reacted with ethylchloroformate in the presence of a hydrochloric acid absorbent to produce the desired ethyl 3-sulfolanyl (N-methyl) carbamate.

To produce the sulfolanyl thiocarbamates or sulfolanyl dithiocarbamates it is only necessary to replace the chloroformate in the reaction by an ester of chloro-thiol-formic acid or an ester of chloro-dithio-formic acid. For example to produce methyl 3-(2,4-dimethylsulfolanyl (N-ethyl)) dithiocarbamate, 2,4-dimethylsulfolene is treated with ethylamine under pressure and the resulting ethyl 2,4-dimethylsulfolanylamine is reacted with methyl chlorodithioformate in the presence of a hydrochloric acid absorbent to produce the desired methyl 3-(2,4-dimethylsulfolanyl (N-ethyl)) dithiocarbamate.

In the preferred reaction for the production of the novel compounds any variety of proportions may be used. A preferred set of proportions are those in which there is an approximately equal molar quantity of both reactants. A still more preferred set of proportions are those in which there is a slight excess of the chloroformate, i. e. from 1 to 10% mol excess of the chloroformate. An excess of the sulfolanyl amine may also be used but it is preferred to use an excess of the chloroformate as it is much easier to remove the excess chloroformate from the reaction medium after the reaction has been completed.

The temperature at which the preferred reaction may be carried out may vary as required by the nature of the reacting substances. The more preferred temperature is below room temperature. The reaction proceeds particularly smooth when the temperature is maintained below 10° C. The reaction proceeds at higher temperatures, however, but less contaminated products are obtained and there is less chance of polymerization when the reaction is conducted at the preferred lower temperatures. The lower temperature limit should be above freezing temperature of the reaction matter. In most cases, the low temperature range will be above −25° C. In general the reaction may be effectively carried out at atmospheric pressures. However, subatmospheric or superatmospheric pressure may be employed if desired or necessary.

It is particularly desirable to carry out the reaction in the presence of a substance to take up the HCl that is formed in the reaction. Such substances as pyridine, quinoline, dimethylaniline, or inorganic bases as $Ca(OH)_2$, NaOH and KOH may be added in appropriate amounts for this purpose, e. g. slightly greater molar amount than the amount of chloroformate being used.

Although the reaction between the amine and chloroformate may be carried out without the addition of solvents, it may, in some cases, be advantageous to carry out the reaction in the presence of a mutual solvent. Such solvent provides a smoother reaction and decreases the production of by-products. Suitable solvents for the reaction medium are, for example, chloroform, dioxane, benzene, etc.

Upon completion of the reaction the sulfolanyl carbamate is separated from the reaction mixture, which will generally include unreacted chloroformate preferably added in excess to the charge, by any suitable means comprising such steps as, for example, distillation, washing, solvent extraction, filtration, and the like.

The reaction is executed in any convenient type of apparatus enabling intimate contact of the reactants and control of operating conditions. The process may be carried out in batch, semi-continuous or continuous operation. When a continuous operation is employed, reactants continuously withdrawn from the reaction zone are preferably subjected to a substantially continuous product separating operation under conditions enabling the continuous recycling to the reaction zone of separated unreacted materials.

The compounds of the invention represented by the general structural formula given hereinabove wherein $R_1$ is an unsaturated hydrocarbon radical are very readily polymerized into compositions of matter that find wide industrial applications. The polymers of the novel sulfolanyl carbamates containing the unsaturated hydrocarbon radicals ($R_1$) are particularly beneficial since they combine the advantageous properties of the sulfur polymers with the advantageous properties of the ethenoid polymers. A preferred group of the compounds of the invention to be polymerized are those sulfolanyl carbamates in accordance with the general structural formula of the compounds of the invention wherein $R_1$ is an allyl-type radical. Of these a preferred group consists of those compounds wherein $R_1$ is an allyl-type radical having a terminal methylene group and $X$ and $X_1$ are both oxygen atoms. Representative examples of these preferred compounds that are readily polymerized are allyl 3-sulfolanyl carbamate, methallyl 3-sulfolanyl carbamate, chloroallyl 3-sulfolanyl carbamate, methyl vinyl carbinyl 3-sulfolanyl carbamate, etc.

The compounds can be polymerized singly or in admixture with one another or with other polymerizable compounds in a variety of proportions. Among such other compounds are monoethylenic compounds, which contain a single polymerizable carbon-to-carbon double bond, of which an important subclass consists of those compounds containing in the molecule a terminal methylene group attached to carbon by an ethylenic double bond

Examples of this class of compounds are styrene, alpha-methyl styrene, many vinyl and allyl derivatives, and the nitriles and many of the esters of acrylic and alpha-substituted acrylic acids.

Another group of copolymerizable compounds consists of those compounds having two or more conjugated carbon-to-carbon double bonds, such as butadiene and substituted butadiene, as well as polymers of acetylene, such as vinyl and divinyl acetylene. Others are unsaturated cyclic compounds such as coumarone, indene, furfural and cyclohexene.

Some of the most important copolymerizable compounds, however, have two or more polymerizable non-conjugated double bonds. An important subclass consists of the unsaturated aliphatic poly-esters of saturated polybasic acids, examples of which are divinyl, diallyl, and dimethallyl esters of oxalic, malonic, citric and tartaric acids. Another subclass consists of the unsaturated aliphatic polyethers of saturated polyhydric alcohols, such as divinyl, diallyl and dimethallyl ethers of glycol, di-ethylene glycol, trimethylene glycerol, and similar derivatives of diglycerol, mannitol, sorbitol, and the like. Another subclass consists of the unsaturated aliphatic organic acid poly-esters of polyhydric alcohols, such as acrylic and methacrylic poly-esters of glycol. Another subclass consists of the unsaturated aliphatic alcohol esters of the unsaturated aliphatic acids, such as the vinyl, allyl, and methallyl esters of acrylic, methacrylic and the like. Still another class consists of the unsaturated poly-esters of dibasic aromatic acids, such as divinyl, diallyl and dimethallyl esters of phthalic acid, isophthalic acid, and the naphthalene dicarboxylic acids. Instead of the esters and ethers, the corresponding sulfur and nitrogen compounds, i. e. thio-esters, thio-ethers, amides and amines may be used.

The monomers of the invention may be polymerized also in the presence of already-formed plastics, including natural resins, cellulose derivatives and synthetic resins. Other modifiers, including plasticizers, stabilizers, lubricants, dyes, pigments and fillers, may be added to the monomer prior to polymerization or may be added to partially polymerized sulfolanyl carbamate material during polymerization, provided they do not chemically react with or otherwise adversely affect the ingredients of the reaction mixture. Otherwise, these modifiers may be added following polymerization. The nature and amount of the modifiers used will depend upon the particular sulfolanyl carbamate involved, upon the method of polymerization and upon the intended use of the product.

The compounds may be polymerized in bulk in the absence of solvent or diluent. The polymerization can be effected in solution in a substance which is a solvent for the reactants and polymer, or which is a solvent for the reactants but a non-solvent for the polymer. Emulsifying, granulating and wetting agents may be present. It is also possible to effect polymerization by atomizing the reactants or a solution thereof in the form of a fine spray into a heated chamber containing an inert gas. It is likewise feasible to polymerize the novel compounds of the invention dispersed in the interstices in the fibrous material such as a fabric. In all such cases the polymerization may be either continuous or discontinuous and may be conducted at atmospheric, superatmospheric or reduced pressure.

The polymerization is usually energized by heat, although both heat and light can be used. Temperatures of about 60° C. to about 150° C. are preferred, however, higher and lower temperatures may be used. Catalysts can be used to hasten the polymerization. The common peroxide types of catalysts such as benzoyl peroxide, di-tertiary butyl peroxide, acetyl peroxide, benzoyl acetyl peroxide, lauryl peroxide and hydrogen peroxide are preferred. Oxygen and azone markedly affect the rate of polymerization. Polymerization of the monomer is retarded by polymerization inhibitors, such as, for example, hydroquinone and other di- and tri-hydroxy aromatic compounds. Inhibitors may be used to completely or substantially completely, prevent the polymerization of monomeric material in storage or may be present in the material during polymerization, usually in the concurrent presence of a polymerization catalyst, for the purpose of controlling the rate thereof or of producing a product of certain desired properties.

The polymers of the invention may be normally liquid to solid, but preferably are solid. They are usually substantially colorless and odorless. The solid polymers can be produced as sheets, rods, tubes and filaments, and can be cast in an infinite variety of shapes. They can be subjected to extrusion and to injection and compression molding in the presence or absence of added diluents. Some of the polymers form tough adherent flexible coatings. They may be used as electrical insulation and for a great variety of other similar purposes.

The compounds of the invention not only find use in producing valuable polymeric matters but find use in a great variety of other industrial applications. They are useful in the resin and lacquer industry as solvents and plasticizers for the manufacture of dopes, fabric coatings, sprays and moulding compositions. They may be used as plasticizers and softening agents for synthetic rubbers. They may also be further reacted to produce valuable substances to be used as addition agents in lubricating oils, greases, and as detergents. Other uses are as insecticides, antioxidants, as softening agents for the leather industry, and as selective solvents in extractive distillation processes.

The following examples serve to illustrate the invention and are not to be considered as limiting the invention in any way.

Example I

To a mixture of 224 grams of 3-sulfolanylamine, 154 grams of pyridine and 200 cc. of chloroform was slowly added 208 grams of allylchloroformate in 150 cc. of chloroform. The reaction was surrounded by a cooling bath and the addition was regulated so the temperature did not go below 0° C. or above 10° C. When the addition was complete the mixture was allowed to warm to room temperature and stirred over night. The reaction mixture was then washed with water, dilute hydrochloric acid, and water. The oil remaining solidified after drying. On crystallization from ethyl alcohol the allyl 3-sulfolanyl carbamate formed a white crystalline solid which melted at 61–62° C. Analysis of the product showed 6.13% nitrogen and 14.3% sulfur while calculations show 6.39% nitrogen and 14.6% sulfur.

Example II

The allyl 3-sulfolanyl carbamate produced in Example I was heated at 60° C. with 2% benzoyl peroxide. A hard, clear resin was produced.

The allyl 3-sulfolanyl carbamate was heated at 90° C. with ditertiary butyl peroxide to produce a hard, clear, flexible resin.

Example III

Ten per cent allyl 3-sulfolanyl carbamate and ninety per cent by weight of diallyl phthalate were mixed together and two per cent by weight of benzoyl peroxide was added. The casting was cured at 65° C. in an oil bath for six days. At the end of that time the product was a practically colorless resin having a Barcol hardness of 40.

Example IV

Ten per cent allyl 3-sulfolanyl carbamate and ninety per cent by weight of diallyl diglycolate were mixed together and two per cent by weight of benzoyl peroxide was added. The solution was heated for 6 days at 65° C. in an oil bath. The resulting product was a slightly yellow resin with a Barcol hardness of 49.

Example V

A solution of ten per cent allyl 3-sulfolanyl carbamate and ninety per cent by weight of methacrylonitrile was prepared and two per cent by weight of benzoyl peroxide was added. After heating for 6 days at 65° C. a clear, amber resin was obtained with a Barcol hardness of 46.

Example VI

A solution of ten per cent allyl 3-sulfolanyl carbamate and ninety per cent by weight of styrene was prepared and two per cent by weight of benzoyl peroxide was added. After heating at 65° C. in an oil bath for 6 days a hard, cloudy resin was obtained.

Example VII

To approximately 1.66 moles of 3-sulfolanylamine, 1.95 moles of pyridine and 200 cc. of chloroform is slowly added 1.73 moles of methallyl chloroformate in 150 cc. of chloroform. The reaction is surrounded by a cooling bath and the addition regulated so that the temperature was maintained between 0° C. and 10° C. When the addition is complete the mixture is allowed to warm to room temperature and then stirred over night. The reaction mixture is then washed with water, dilute hydrochloric acid, and water. The residue is allowed to solidify and dry. The methallyl 3-sulfolanyl carbamate produced is then crystallized from ethyl alcohol.

The methallyl 3-sulfolanyl carbamate is then heated at 90° C. with di-tertiary butyl peroxide to produce a hard, clear resin.

Ten per cent methallyl 3-sulfolanyl carbamate and 90% by weight of diallyl diglycolate are mixed together and 2% benzoyl peroxide is added. The mixture is heated for 6 days at 65° C. The resulting product is a hard resin.

Example VIII

To approximately 2 moles of 3-sulfolanylamine, 2.25 moles of pyridine and 230 cc. of chloroform is slowly added 2.13 moles of chloromethallyl chloroformate in 180 cc. of chloroform. The reaction is surrounded by a cooling bath and the addition of the chloromethallyl chloroformate is regulated so that the temperature is maintained between 0° C. and 10° C. When the addition is complete the mixture is allowed to warm to room temperature and then stirred for approximately 8 hours. The reaction mixture is then washed with water, dilute hydrochloric acid and with water again. The residue is allowed to solidify and dry. The chloromethallyl 3-sulfolanyl carbamate produced is crystallized from ethyl alcohol.

The chloromethallyl 3-sulfolanyl carbamate so produced is then heated at 60° C. with 2% benzoyl peroxide to produce a hard resin.

Example IX

To approximately 1.66 moles of 3-sulfolanylmethylamine, 1.95 moles of pyridine and 200 cc. of chloroform is slowly added 1.73 moles of the butyl ester of chloro-thiol-formic acid in 150 cc.

of chloroform. The reaction is surrounded by a cooling bath and the temperature maintained at between 0° C. and 10° C. When the addition is complete the mixture is allowed to cool to room temperature and stirred for approximately 8 hours. The reaction mixture is then washed with water, dilute hydrochloric acid, and water. After the residue solidifies and dries it is crystallized from ethyl alcohol to produce butyl 3-sulfolanyl (N-methyl) thiocarbamate.

*Example X*

Following the general procedure outlined above the following compounds are also prepared: dimethyl vinyl carbinyl 3-(2,4-dimethylsulfolanyl) carbamate is produced by reacting 2,4-dimethyl-3-sulfolanylamine with dimethyl vinyl carbinyl ester of chloroformic acid; methyl 3-sulfolanyl thiocarbamate is produced by reacting 3-sulfolanylamine with the methyl ester of chloro-thiol-formic acid; methyl 3-(2-methylsulfolanyl) carbamate is produced by reacting 2-methyl-3-sulfolanylamine with methyl chloroformate; ethyl 3-sulfolanyl (N-methyl) thiocarbamate is produced by reacting methyl 3-sulfolanylamine with the ethyl ester of chloro-thiolformic acid; butyl 3-(2-chloro-3-methylsulfolanyl) carbamate is produced by reacting 2-chloro-3-methyl-3-sulfolanylamine with butyl chloroformate; methallyl 3-(2,5-diethylsulfolanyl) carbamate is produced by reacting 2,5-diethyl-3-sulfolanylamine with methallyl chloroformate; chloroallyl 3-(2,4-dimethylsulfolanyl) thiocarbamate is produced by reacting 2,4-dimethyl-3-sulfolanylamine with chloroallyl chlorothio-formate; ethyl isopropenyl carbinyl 3-(5-phenylsulfolanyl) carbamate is produced by reacting 5-phenyl-3-sulfolanylamine with ethyl isopropenyl carbinyl chloroformate; propallyl 3-sulfolanyl (N-ethyl) thiocarbamate is produced by reacting ethyl 3-sulfolanylamine with the propallyl ester of chloro-thio-formic acid; and methallyl 3-(2-vinylsulfolanyl) carbamate is produced by reacting 2-vinyl-3-sulfolanylamine with methallyl chloroformate.

We claim as our invention:

1. Allyl 3-sulfolanyl carbamate.
2. Methallyl 3-sulfolanyl carbamate.
3. Chloroallyl 3-sulfolanyl carbamate.
4. A sulfolanyl carbamate wherein a nuclear carbon atom of the sulfolanyl radical is directly linked by a single bond to a nitrogen atom which in turn is directly joined to the carbinyl carbon atom of a formic acid ester of a beta,gamma-unsaturated monoolefinic, monohydric aliphatic alcohol having attached to the hydroxy oxygen atom an alken-2-yl radical containing 3 to 6 carbon atoms.
5. A sulfolanyl carbamate wherein a nuclear carbon atom of the sulfolanyl radical is directly linked by a single bond to a nitrogen atom which in turn is directly joined to the carbinyl carbon atom of a formic acid ester of a beta,gamma-unsaturated alcohol having attached to the hydroxy oxygen atom an alken-2-yl radical containing 3 to 20 carbon atoms.
6. A sulfolanyl carbamate wherein a nuclear carbon atom of the sulfolanyl radical is directly linked by a single bond to a nitrogen atom which in turn is directly joined to a carbinyl carbon atom of a formic acid ester of an alcohol having attached to the hydroxy oxygen atom a hydrocarbon radical containing 1 to 20 carbon atoms.
7. A sulfolanyl thiocarbamate wherein a nuclear carbon atom of the sulfolanyl radical is directly linked by a single bond to the nitrogen atom of the thiocarbamate radical which is directly joined by a single bond to an alken-2-yl radical containing from 3 to 6 carbon atoms.
8. A sulfolanyl dithiocarbamate consisting of a five-membered heterocyclic nucleus of four nuclear carbon atoms and one sulfonyl radical, wherein one of the nuclear carbon atoms is directly linked by a single bond to the nitrogen atom of the dithiocarbamate radical which is directly joined by a single bond to an alken-2-yl radical containing from 3 to 6 carbon atoms.
9. A polymer of allyl 3-sulfolanyl carbamate.
10. A polymer of a sulfolanyl carbamate wherein a nuclear carbon atom of the sulfolanyl radical is directly linked by a single bond to a nitrogen atom which in turn is directly linked to a carbinyl carbon atom of a formic acid ester of an alcohol having attached to the hydroxy oxygen atom an alken-2-yl radical containing a terminal methylene group and from 3 to 6 carbon atoms.
11. A polymer of a sulfolanyl carbamate wherein a nuclear carbon atom of the sulfonyl radical is directly linked by a single bond to a nitrogen atom which in turn is directly linked to a carbinyl carbon atom of a formic acid ester of a beta,gamma-unsaturated alcohol having attached to the hydroxy oxygen atom an alken-2-yl radical containing 3 to 20 carbon atoms.
12. A polymer of a sulfolanyl thiocarbamate wherein a nuclear carbon atom of the sulfolanyl radical is directly linked by a single bond to the nitrogen atom of thiocarbamate radical which is directly joined by a single bond to an alken-2-yl radical containing from 3 to 6 carbon atoms.
13. A polymer of 10% allyl 3-sulfolanyl carbamate and 90% of an unsaturated aliphatic poly-ester of a polybasic acid.
14. A polymer of 10% allyl 3-sulfolanyl carbamate and 90% of an unsaturated aliphatic poly-ether of a polyhydric alcohol.
15. A compound of the formula:

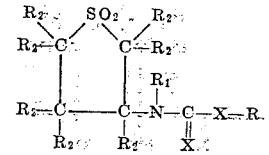

wherein X is a member of the group consisting of oxygen and sulfur atoms, R is a hydrocarbon radical containing from 1 to 20 carbon atoms, and R1 and R2 are members of the group consisting of hydrogen atoms, and hydrocarbon radicals.

16. A resin comprising a polymer of a compound having the formula:

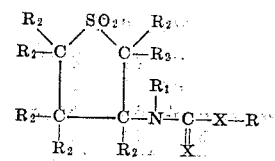

wherein X is a member of the group consisting of oxygen and sulfur atoms, R is an alken-2-yl radical containing from 3 to 20 carbon atoms, and R1 and R2 are members of the group consisting of hydrogen atoms and hydrocarbon radicals.

17. A process for the production of allyl 3-sulfolanyl carbamate which comprises reacting 3-sulfolanyl amine with allyl chloroformate in the presence of pyridine.

18. A process for the production of compounds of claim 15 which comprises reacting a sulfolanyl amine of the formula:

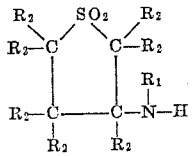

wherein $R_1$ and $R_2$ are members of the group consisting of hydrogen atoms and hydrocarbon radicals with an ester of (1) an alcohol containing from 1 to 20 carbon atoms, and (2) an acid selected from the group consisting of chloroformic acid, chloro-thiol-formic acid, and chloro-dithioformic acid.

RUPERT C. MORRIS.
ROBERT M. HOROWITZ.

REFERENCES CITED

The following references are of record in the file of this patent:

UNITED STATES PATENTS

| Number | Name | Date |
|---|---|---|
| 2,372,161 | Morris | Mar. 20, 1945 |
| 2,401,549 | Chenicek | June 4, 1946 |
| 2,419,082 | Morris | Apr. 15, 1947 |